United States Patent
Biber

(10) Patent No.: US 11,852,484 B2
(45) Date of Patent: Dec. 26, 2023

(54) METHOD FOR DETERMINING THE ORIENTATION OF A ROBOT, ORIENTATION DETERMINATION APPARATUS OF A ROBOT, AND ROBOT

(71) Applicant: Robert Bosch GmbH, Stuttgart (DE)

(72) Inventor: Peter Biber, Poltringen (DE)

(73) Assignee: Robert Bosch GmbH, Stuttgart (DE)

( * ) Notice: Subject to any disclaimer, the term of this patent is extended or adjusted under 35 U.S.C. 154(b) by 404 days.

(21) Appl. No.: 16/635,719

(22) PCT Filed: Jul. 24, 2018

(86) PCT No.: PCT/EP2018/070040
§ 371 (c)(1),
(2) Date: Jan. 31, 2020

(87) PCT Pub. No.: WO2019/025241
PCT Pub. Date: Feb. 7, 2019

(65) Prior Publication Data
US 2021/0131805 A1    May 6, 2021

(30) Foreign Application Priority Data
Aug. 4, 2017    (DE) ................... 10 2017 213 577.8

(51) Int. Cl.
G01C 21/00    (2006.01)
G01C 21/20    (2006.01)

(52) U.S. Cl.
CPC ........... G01C 21/005 (2013.01); G01C 21/20 (2013.01)

(58) Field of Classification Search
None
See application file for complete search history.

(56) References Cited

U.S. PATENT DOCUMENTS

2018/0340788 A1* 11/2018 Liu ................. G01C 21/30

FOREIGN PATENT DOCUMENTS

| CN | 103292804 A | 9/2013 |
| DE | 10 2012 219 478 A1 | 4/2013 |
| DE | 10 20125 219 478 A1 | 4/2013 |
| DE | 10 2012 200 445 A1 | 7/2013 |

(Continued)

OTHER PUBLICATIONS

Von Luxburg, Ulrike. A Tutorial on Spectral Clustering. Max Planck Institute for Biological Cybernetics. Statistics and Computing, 17 (4), 2007 (Year: 2007).*

(Continued)

*Primary Examiner* — Jeffrey C Boomer
(74) *Attorney, Agent, or Firm* — Maginot, Moore & Beck LLP

(57) ABSTRACT

The disclosure relates to a method for determining the orientation of a robot and comprises at least one method step in which expected orientation data (I) pertaining to an expected orientation of the robot are provided and a method step in which actual orientation data (II) pertaining to an actual orientation of the robot are provided. According to the disclosure, one method step involves the expected orientation data (I) and the actual orientation data (II) being used to ascertain outlier-free orientation data that are used for determining the orientation of the robot. The disclosure further relates to a robot and to an orientation determination apparatus.

14 Claims, 2 Drawing Sheets

(56) References Cited

FOREIGN PATENT DOCUMENTS

| DE | 10 2013 203 549 A1 | 9/2014 | | |
|----|----|----|----|----|
| DE | 10 2014 211 166 A1 | 5/2015 | | |
| DE | 10 2014 211 178 A1 | 6/2015 | | |
| EP | 2 749 983 A2 | 7/2014 | | |
| WO | 2017/066904 A1 | 4/2017 | | |
| WO | 2017/076929 A1 | 5/2017 | | |
| WO | WO-2017076929 A1 * | 5/2017 | ............. | G01C 21/32 |

OTHER PUBLICATIONS

International Search Report corresponding to PCT Application No. PCT/EP2018/070040, dated Oct. 30, 2018 (German and English language document) (7 pages).
Luxburg, Ulrike von; A tutorial on spectral clustering; Statistics and Computing, 2007; vol. 17, No. 4, pp. 395-416; ISSN 0960-3174 (P).
Goel, P et al.; Robust Localization Using Relative and Absolute Position Estimates, Proceedings of the 1999 IEEE/RSJ International Conference on Intelligent Robots and Systems, Kyongju, South Korea Oct. 17-21, 1999, Piscataway, NJ, USA, vol. 2, pp. 1134-1140, XP010362491.

* cited by examiner

METHOD FOR DETERMINING THE ORIENTATION OF A ROBOT, ORIENTATION DETERMINATION APPARATUS OF A ROBOT, AND ROBOT

This application is a 35 U.S.C. § 371 National Stage Application of PCT/EP2018/070040, filed on Jul. 24, 2018, which claims the benefit of priority to Serial No. DE 10 2017 213 577.8, filed on Aug. 4, 2017 in Germany, the disclosures of which are incorporated herein by reference in their entirety.

BACKGROUND

The disclosure relates to a method for determining the position of a robot, in particular of an autonomous robot. The disclosure furthermore relates to such a robot, in particular an autonomous robot.

The disclosure is based on a method for determining the position of a robot, in particular of an autonomous robot, comprising at least a method step in which expected position data $p_p^t$ regarding an expected position of the robot are provided, and a method step in which actual position data $p_u^t$ regarding an actual position of the robot are provided. In one embodiment, the method steps may also be implemented in a single method step.

A "robot", in particular an "autonomous robot", should be understood in particular to mean an at least partly automatic mobile device that at least partly independently carries out a task, preferably treatment of a surface—what is known as the treatment surface. The robot should in particular independently start and/or independently finish a task and/or independently select and/or influence at least one parameter relating to the treatment of the treatment surface. It should furthermore in particular be understood to mean a device that moves independently and/or propels itself autonomously in the predefined working area of the treatment surface, at least in order to carry out this task, in particular in order to treat the treatment surface. Typical fields of application for such robots comprise a wide variety of tasks, such as for example sweeping, vacuum cleaning, cleaning, mowing the lawn, gathering, sorting, watering, fertilizing, mapping or the like. Relevant principles and the technical teaching of the exemplary embodiments listed below in order to illustrate the advantages of the disclosure may therefore obviously be applied to any desired robots, in particular autonomous robots, for example in particular autonomous sweeping machines, autonomous cleaning robots, autonomous snow removal robots, autonomous vacuum cleaners, autonomous swimming pool-cleaning machines, autonomous floor-wiping robots, autonomous lawnmowers, autonomous sewing machines, autonomous watering robots, autonomous fertilizing machines, autonomous mapping machines and the like.

Automatic or at least partly automatic mobile working devices, such as robots, in particular autonomous robots such as for example soil cultivation machines, are intended in general to move independently within a defined working area without leaving this working area. To this end, it is necessary to determine the position of the robot, in particular in the context of a method for determining the position of the robot. "Method for determining the position of the robot" should therefore be understood to mean a method that serves to change the location, in particular for the kinematic movement, of the robot, at least in connection with a navigation method or as part of a navigation method of the robot, and in particular allows autonomous mobile movement of the robot in the first place.

In one embodiment of the method, the position determination method may also be implemented in the form of a method independent of a navigation method. The navigation method monitors, coordinates and controls for example tasks regarding path planning and movement control of the robot. In the context of a navigation method, tasks such as for example calculating a movement plan, calculating a direction of travel, initiating a movement, controlling and/or regulating a movement, in particular in accordance with a movement plan, responding to obstacles on the treatment surface and/or responding to boundaries of the treatment surface are in particular performed. In order to perform the navigation method, position data, that is to say information regarding a position and/or an orientation of the robot in space, in particular on a surface, preferably on the treatment surface, are typically required. Determining and providing such position data, that is to say in particular determining a position and/or an orientation of the robot in space and/or on a surface, however falls within the remit of the position determination method. Typical subtasks of such a method relate for example to determining a relative and/or absolute current position of the robot, measuring positional and/or odometry data, calculating a distance to be covered and the like.

In the present method, in one method step, expected, in particular predicted, possibly inaccurate position data $p_p^t$ regarding an expected position of the robot are provided. "Expected position data $p_p^t$" should be understood to mean in particular data regarding a position and/or an orientation of the robot in space and/or on a surface that need to be assigned to a position of the robot that is not yet verified. In one embodiment of the method, the expected position data $p_p^t$ may in principle simply be a first dataset of position data, irrespective of a particular property of the position data or how they came to exist. By way of example, the expected position data $p_p^t$ may be provided in the form of data from a first sensor device of the robot. As an alternative, the expected position data $p_p^t$ may be considered to be position data that meet particular conditions, for example to be comparatively inaccurate position data. As an alternative, the expected position data $p_p^t$ may be provided in the form of estimated or predicted position data. As an alternative, the expected position data $p_p^t$ may be provided in the form of last valid, in particular last verified, position data of the robot.

In one embodiment of the method, the expected position data $p_p^t$ are provided, in particular measured or recorded and then provided, by way of at least a first sensor device of the robot. The first sensor device is in particular designed as a device for determining position data, preferably positional data and/or odometry data and/or orientation data, and may for this purpose have one or more sensors from a group of sensors comprising at least sensors sensitive to incline, angle, distance, translation, acceleration and rate of rotation. By way of example, the first sensor device may be implemented using drive means used to drive the robot. By way of example, it is possible in particular to evaluate rotations of rolling bodies, wheels, chains or the like that rotate with respect to the treatment surface during the operation of the robot, in order to determine a change in position and/or change in odometry and/or change in orientation. The sensor device, possibly in combination with a computer unit, is in particular designed to determine covered distances in the direction of travel of the robot moving on a path, preferably including a covered angle of travel on the path. As an alternative or in addition, the first sensor device may also comprise further sensors for determining position data. By way of example, a position determination may also be performed using GPS sensors, echo sensors, sonar sensors, ultrasound sensors, radar sensors, distance sensors, lidar sensors (light detection and ranging), camera sensors, stereo camera sensors, inertial sensors or other sensors that appear expedient to a person skilled in the art for determining positional data and/or odometry data and/or orientation data. It is pointed out that the first sensor device for providing the expected position data $p_p^t$ may also be intended to provide, in particular to measure or to record and then to provide, position data using a multiplicity of such sensors. By way of example, the expected position data $p_p^t$ are able to be calculated, in particular fused or averaged, from sensor data provided by a plurality of sensors.

In one exemplary embodiment, the expected position data $p_p^t$ are measured and provided repeatedly, in particular continuously or virtually continuously, by way of a first sensor device, wherein the first sensor device is implemented in the form of an odometry sensor device using drive means used to drive the robot. By way of example, the position data are measured at a frequency of 50 Hz and thus provided in up-to-date form (a frequency of up to 2000 Hz may be used in the case of expected position data $p_p^t$ provided by way of an inertial sensor system).

"Provided" or "intended" should in particular specifically be understood to mean "programmed", designed", "configured" and/or "equipped". An object being "intended" for a particular function should in particular be understood to mean that the object performs and/or executes this particular function in at least one application and/or operating state or is designed to perform the function.

In one alternative or additional embodiment of the method, the expected position data $p_p^t$ are provided based on previously determined actual position data $p_u^t$. It is conceivable for example to adopt the expected position data $p_p^t$ as the last verified position of the robot—that is to say for example as the last actual position data $p_u^{t-1}$, provided that the last actual position data $p_u^{t-1}$ constitute/constituted position data that are free from outliers.

In the present method, in one method step, actual, in particular measured position data $p_u^t$, which are preferably comparatively accurate in comparison with the expected position data $p_p^t$, regarding an actual position of the robot are provided. "Actual position data $p_u^t$," should in particular be understood to mean data regarding a position and/or an orientation of the robot in space and/or on a surface that need to be assigned to an accurate or at least more accurate determination of the position of the robot. In one embodiment of the method, the actual position data $p_u^t$ may in principle simply be a second dataset of position data, irrespective of a particular property of the position data or how they came to exist. By way of example, the actual position data $p_u^t$ may be provided in the form of data from a second sensor device of the robot. As an alternative, the actual position data $p_u^t$ may be considered to be data meeting certain conditions, for example to be more accurate data in comparison with the expected position data $p_p^t$. As an alternative, the actual position data $p_u^t$ may be provided in the form of measured position data, for example in contrast to estimated or predicted or previously calculated expected position data $p_p^t$.

In one embodiment of the method, the actual position data $p_p^t$ are provided, in particular recorded in the form of absolute position data and provided, by way of at least a second sensor device of the robot. The second sensor device is in particular designed as a device for determining position data, preferably positional data and/or odometry data and/or orientation data, and may in principle be implemented, in one embodiment, according to at least one of the embodiments regarding the first sensor device. In one embodiment, the second sensor device is intended to measure and to provide absolute position data. Absolute position data should in particular be understood to mean "non-relatively measured" position data that make it possible to provide information about the position of the robot without referring to previously measured position data.

It is pointed out at this juncture that the second sensor device for providing the actual position data $p_u^t$ may also be intended to provide, in particular to measure or to record and then to provide, position data using a multiplicity of sensors. By way of example, the actual position data $p_u^t$ are able to be calculated, in particular averaged or fused in another way, from sensor data provided by a plurality of sensors.

In one embodiment of the method, the actual position data $p_u^t$ are determined and provided by way of a map comparison method from position data provided by way of the first sensor device and/or by way of the second sensor device. A map comparison method should be understood to mean a method in which the provided position data, in particular the position data recorded or measured by way of the first sensor device and/or by way of the second sensor device, of the robot and/or of measured surroundings of the robot are compared with position data of a digital map, in particular of a map stored on the robot, and the actual position data $p_u^t$ are determined therefrom.

In one exemplary embodiment, the actual position data $p_u^t$ are determined by way of a map comparison method from position data provided by way of the first sensor device, wherein the first sensor device determines expected position data $p_p^t$ on the basis of positional and/or odometry data.

In one alternative or additional exemplary embodiment, surroundings data are measured and provided repeatedly, in particular continuously or virtually continuously, by way of a lidar sensor of the second sensor device. "Surroundings data" should be understood to mean in particular distances from the robot to objects surrounding the robot. By way of example, these surroundings data (in a broader sense also position data) are measured at a frequency of 1 to 100 Hz and thus provided in up-to-date form (typical frequencies may be for example: lidar sensor 10-100 Hz; camera sensor 10-100 Hz, GPS sensor 1-10 Hz). These position data are then compared with position data of a digital map. The digital map is in this case present in a manner stored on the robot internally in the device or is loaded from an external storage device (for example a computer, a server or the like) by way of a data communication interface. As an alternative, the comparison with the digital map may also be performed on a server external to the device. It is noted that a cycle rate or repetition rate of the method according to the disclosure may however be selected so as to be independent of a cycle rate of a sensor that is used.

In one embodiment of the method, the expected position data $p_p^t$ and the actual position data $p_u^t$ are compared with one another in order to be able to establish deviations and/or errors in particular in the expected (typically more inaccurate) position data $p_p^t$. Should such deviations and/or errors occur, that is to say the expected position data $p_p^t$ and the actual position data $p_u^t$ do not match within the scope of a tolerable deviation, then the expected position data $p_p^t$ may be corrected, in particular overwritten, using the actual position data $p_u^t$. As a result, when such a deviation and/or such an error is established, the actual (typically more accurate) position data $p_u^t$ may be used for a further determination of the position of the robot.

However, incorrect measurements and/or ambiguities may also occur in the case of the actual position data $p_u^t$. Thus, for example, position data determined using the second sensor device—in the exemplary embodiment the surroundings data of a position of objects in the surroundings as measured by way of the lidar sensor—may deviate from the mapped position of the object in the map as determined in the scope of a map comparison method. This may be down to measurement errors of the sensor device (the lidar sensor) and/or inaccuracies in the map and/or errors in the map comparison method. In particular in the case of such incorrect measurements and/or ambiguities, the risk may exist that the in particular inaccurate expected position data $p_p^t$ are replaced with incorrect t actual position data $p_u^t$ in the position determination method and an inaccuracy in the position determination is thereby increased.

According to the disclosure, in an in particular further method step, position data that are free from outliers and that are used to determine the position of the robot are therefore determined using the expected position data $p_p^t$ and the actual position data $p_u^t$. By virtue of the method according to the disclosure, it is advantageously possible to achieve simple and targeted detection of outliers in the position data $p_p^t$ and $p_u^t$ to be used, such that position data that are free from outliers, in particular based on the expected position data $p_p^t$ and/or the actual position data $p_u^t$, are subsequently available for a further determination of the position of the robot. It is thereby in particular possible to ensure that only position data that are not impacted by errors or inconsistent, that is to say do not constitute an outlier, are used for a position determination. The accuracy and reliability of the determination of the position of the robot is therefore able to be increased significantly.

In one embodiment of the method according to the disclosure, in order to determine position data that are free from outliers, mutually consistent expected position data $p_p^t$ and actual position data $p_u^t$ are determined by way of similarity analysis of the expected position data $p_p^t$ and of the actual position data $p_u^t$. "Similarity analysis" should be understood to mean in particular a method by way of which it is possible to determine a measure for the mutual consistency between the expected position data $p_p^t$ and the actual position data $p_u^t$. Outliers are thus able to be detected particularly easily both in the expected position data $p_p^t$ and in the actual position data $p_u^t$.

In one embodiment of the method according to the disclosure, mutually consistent expected position data $p_p^t$ and actual position data $p_u^t$ are determined by creating a similarity matrix W. A "similarity matrix W" in this case constitutes a simple method by way of which expected position data $p_p^t$ and actual position data $p_u^t$ are able to be checked for paired, that is to say mutual, consistency. A similarity matrix in particular constitutes a matrix of individual values that expresses the similarity between at least two multidimensional data points.

In one exemplary embodiment (but without restricting the generality), consideration is given to determining a position in two dimensions, that is to say in an area. The position of the robot is considered to be given by $p=(x,y,\varphi)$. In this case, $(x,y)$ may represent Cartesian coordinates in the area, wherein $\varphi$ denotes the orientation of the robot (typically with respect to "North"). The expected position data $p_p^t$ at the time t are denoted $p_p^t$ and the actual position data at the time t are denoted $p_u^t$. A relative movement of the robot between the times t1 and t2 with respect to the expected position data and the actual position data is then given by $$\Delta p_p^{t1,t2} = p_p^{t1} \theta p_p^{t2}$$

or $$\Delta p_u^{t1,t2} = p_u^{t1} \theta p_u^{t2},$$

wherein θ represents a difference operator between positions of the robot. In the case of position data that are free from outliers, the difference between the expected position data and the difference between the actual position data with the exception of statistically induced noise should be substantially identical, that is to say the difference between $\Delta p_p^{t1,t2}$ and $\Delta p_u^{t1,t2}$ with the exception of statistically induced noise is equal to zero:

$$\Delta^{t1,t2} = \Delta p_p^{t1,t2} \theta \Delta p_u^{t1,t2} = 0$$

If this condition is met, then the underlying expected position data $p_p^t$ and the underlying actual position data $p_u^t$ are considered to be consistent in pairs or mutually consistent.

Statistical noise may be quantified by way of an in particular time-dependent covariance matrix $C^{t1,t2}$. The error may then be defined as the difference $\Delta^{t1,t2}$ weighted by the covariance matrix $C^{t1,t2}$, that is to say:

$$g^{t1,t2} = (\Delta^{t1,t2})^T C^{t1,t2} \Delta^{t1,t2}$$

And the similarity may be specified by way of a Gaussian similarity function:

$$s(g^{t1,t2}) = \exp(-g^{t1,t2}/2) = \exp((\Delta^{t1,t2})^T C^{t1,t2} \Delta^{t1,t2}/2),$$

wherein $(\Delta^{t1,t2})^T$ represents the transposed matrix of $\Delta^{t1,t2}$.

In one embodiment of the method according to the disclosure, the similarity matrix W may be created in the form of an (n×n) matrix based on in each case n expected position data $p_p^t$ and n actual position data $p_u^t$ that are provided in particular in each case at n times $[t_s, t_{s+1}, \ldots, t_{s+n-1}]$, preferably at n equidistant times. In this way, it is therefore possible to create an (n×n)) similarity matrix W containing the values $W_{i,j} = s(e^{t(s+i),t(s+j)})$. In one embodiment of the method according to the disclosure, the number n, in particular the time between the times $[t_s, t_{s+1}, \ldots, t_{s+n-1}]$, is defined by specifying a resolution accuracy of the position determination. In one embodiment of the method according to the disclosure, n≥3, preferably n≥5, particularly preferably n≥7. By way of example, the number n may be specified by a desired number of measurements per distance covered by the robot, for example by 5 measurements per meter. Using such a specification, it is likewise also possible to define the time between the times $[t_s, t_{s+1}, \ldots, t_{s+n-1}]$.

In one embodiment of the method according to the disclosure, sets of in each case mutually consistent expected position data $p_p^t$ and actual position data $p_u^t$ are determined by way of cluster analysis of the similarity matrix W. "Cluster analysis" should in particular be understood to mean a method for covering similarity structures in the similarity matrix W, that is to say the approach of dividing the heterogenous entirety of "cases" in the similarity matrix W into homogeneous groups or subsets or what are known as "sets". In this case, the similarity of the cases is taken into account on all relevant variables. A cluster analysis method is proposed for example in "A tutorial on spectral clustering" by Luxburg (Statistics and computing, 2007, Springer Verlag [Springer publishing house]).

In one embodiment of the method according to the disclosure, the actual position data $p_u^t$ are used as position data that are free from outliers to determine the position of the robot if precisely one set of mutually consistent expected position data $p_p^t$ and actual position data $p_u^t$ is determined in the similarity matrix W. In particular in a case in which precisely one set of mutually consistent expected position data $p_p^t$ and actual position data $p_u^t$ is not determined in the similarity matrix W, the expected position data $p_p^t$ are used as position data for determining the position of the robot. The number of mutually consistent expected position data $p_p^t$ and actual position data $p_u^t$ may in particular be determined by way of an "eigengap method". Using the actual position data $p_u^t$ as position data that are free from outliers to determine the position of the robot in the case that precisely one set of mutually consistent expected position data $p_p^t$ and actual position data $p_u^t$ is determined in the similarity matrix W makes it possible to increase the position determination accuracy and precision according to the disclosure in the context of the proposed method for determining the position of a robot. In one alternative embodiment of the method according to the disclosure, the actual position data $p_u^t$ are used as position data that are free from outliers to determine the position of the robot if the last provided actual position data $p_u^t$ are determined in the sets of in each case mutually consistent expected position data $p_p^t$ and actual position data $p_u^t$. In one embodiment of the method, the expected position data $p_p^t$ are otherwise used as position data that are free from outliers to determine the position of the robot.

In summary, the method according to the disclosure may be used to determine a particular number of expected position data $p_p^t$ while the robot is moving, for example in the form of inaccurate position data based on a movement of the wheels of the robot, and to determine a particular number of actual position data $p_u^t$, for example in the form of comparatively accurate position data based on a lidar sensor. Using the determined expected position data $p_p^t$ and the determined actual position data $p_u^t$, a similarity matrix W that codes the mutual consistency between respective expected position data $p_p^t$ and actual position data $p_u^t$ for the particular number of expected position data $p_p^t$ and actual position data $p_u^t$ is then created. Cluster analysis is then used to identify sets of in each case mutually consistent expected position data $p_p^t$ and actual position data $p_u^t$. If only a single set of this type is present—that is to say the position data are consistent—then the actual position data $p_u^t$ are used as a basis for the further position determination, for example by applying a Kalman filter.

It is lastly also pointed out that the method according to the disclosure may also be extended to the use of further expected position data $p_p^t$ and/or further actual position data $p_u^t$ that are determined for example using a further sensor device. In this case, the further position data are likewise incorporated into the similarity matrix W, this then adopting a higher dimension.

Also proposed according to the disclosure is a position determination device for use in a robot, in particular in an autonomous robot, that has at least one computer unit that is configured so as to execute the position determination method according to the disclosure.

The "computer unit" should be understood to mean at least one device that has an information input for receiving information, an information processing unit for processing, in particular for calculating information, and an information output for forwarding the processed and/or calculated information. Advantageously, the computer unit has components that comprise at least a processor, a memory and an operating program containing evaluation and calculation routines. The electronic components of the computer unit may advantageously be arranged on a circuit board, for example on a common circuit board with a control device for controlling the robot and in particular also in the form of a microcontroller. The control device and the computer unit may in particular also be implemented in the form of a single component. The computer unit is intended to obtain and to process, in particular to evaluate, to forward and possibly also to store, position data, in particular expected position data $p_p^t$ and actual position data $p_u^t$. The computer unit is in particular intended and programmed to perform the method steps of the method according to the disclosure for determining the position of the robot.

Also proposed according to the disclosure is a robot, in particular an autonomous robot, that has at least a position determination device according to the disclosure, furthermore having at least a first sensor device for determining positional data and/or odometry data and/or orientation data (generally combined in the form of "position data") and for providing expected position data $p_p^t$ derived from the positional data and/or odometry data and/or orientation data, and a second sensor device for determining positional data and/or odometry data and/or orientation data (generally combined in the form of "position data") and for providing actual position data $p_u^t$ derived from the positional data and/or odometry data and/or orientation data. A "sensor device" in this connection should in particular be understood to mean a device that is intended to record at least a characteristic variable and/or an item of information and/or a physical property, wherein the recording may take place actively, such as in particular by generating, emitting and recording a measurement signal, and/or passively, such as in particular by detecting changes in properties of a sensor component. Various sensor devices that appear expedient to a person skilled in the art are conceivable, which may in particular comprise by way of example optical sensors, in particular photographic sensors, acoustic sensors, in particular ultrasound sensors, or else sensors sensitive to incline, distance, translation, acceleration, rotation, contact, inductance, capacitance, temperature, moisture or radiation or chemosensitive sensors or the like. The sensor device at least has sensors for detecting an obstacle and/or a boundary of the treatment surface.

The autonomous robot may in particular be implemented in the form of an autonomous sweeping machine, an autonomous cleaning robot, an autonomous snow removal robot, an autonomous vacuum cleaner, an autonomous swimming pool-cleaning machine, an autonomous floor-wiping robot, an autonomous lawnmower, an autonomous sewing machine, an autonomous fertilizing machine, an autonomous mapping machine or another embodiment of an autonomous robot that appears expedient to a person skilled in the art.

BRIEF DESCRIPTION OF THE DRAWINGS

The disclosure is explained in more detail in the following description with reference to exemplary embodiments illustrated in the drawings. The drawing and the description contain numerous features in combination. A person skilled in the art will expediently also consider the features individually and combine them to form expedient further combinations. Identical reference signs in the figures denote identical elements.

In the figures.

DETAILED DESCRIPTION

Figure 1:
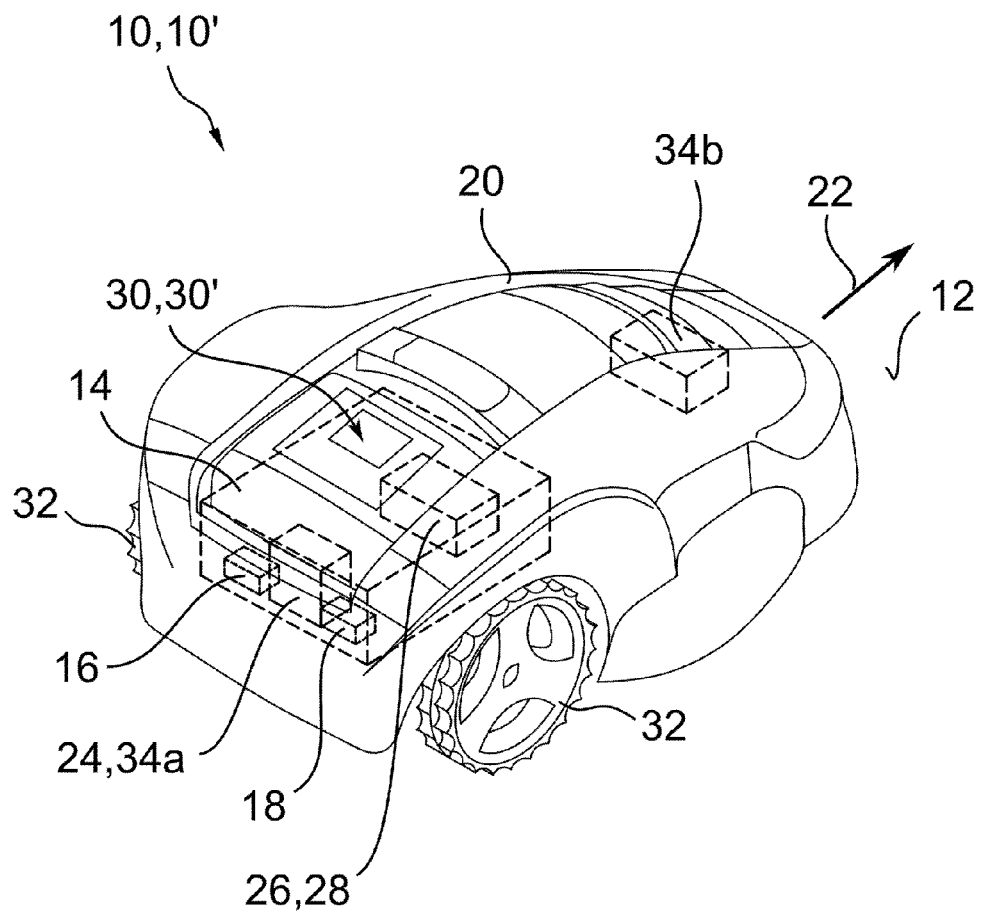
FIG. 1 shows one embodiment of an autonomous robot according to the disclosure in a perspective schematic depiction.

FIG. 1 shows one embodiment of a robot 10, as may be implemented for example as an autonomous robot in the form of an autonomous lawnmower 10'. The robot 10 may for example be intended to treat a surface 12 on which it is moving in any form. The principles described below are able to be transferred to any desired embodiments of the robot 10 in the context of other exemplary embodiments, these being able to perform a wide variety of tasks, for example in the form of vacuum cleaner robots, sweeping robots, cleaning robots, snow removal robots, floor-wiping robots, but in particular also just in the form of mapping robots without a further treatment function.

The robot 10 in FIG. 1, in the exemplary embodiment of an autonomous lawnmower 10', has a control device 14. The control device 14 has at least a storage unit 16, a processor (not illustrated in more detail) and a data communication interface 18 for transmitting data. The control device 14, together with its components, is arranged at least partly in a housing 20 of the robot 10. The data communication interface 18 serves to transmit data, in particular to transmit data in a wireless or wired manner, in particular to transmit data to external devices, for example tablets, smartphones, computers, further robots or the like. The control device 14 is in particular intended to control or to regulate the movement (indicated by an arrow 22) of the robot 10 and in particular to move the robot 10 using a drive unit 24 for moving the robot 10. The robot 10 furthermore has a position determination device 26 that comprises at least one computer unit 28 that is configured and programmed to perform the method according to the disclosure (cf. FIG. 2). The robot 10 furthermore has a user interface 30 by way of which information is able to be output to an operator or information is able to be input by an operator. The output unit is in particular formed by a touch display 30'.

For propulsion purposes, the robot 10, in particular the autonomous lawnmower 10', has wheels 32 that serve to drive and change the direction of the robot 10. The wheels 32 are coupled to a motor (not illustrated here) and are able to be controlled and moved by way of the drive unit 24 for moving the robot 10.

An energy supply device (not illustrated here) of the autonomous robot 10 is intended to supply the robot 10 with electrical energy when it is started and during operation. This device is preferably an energy store that is independent of the power grid, in particular a battery. The energy supply device is in particular able to be resupplied and recharged with energy from a power grid in order to supply energy within and/or outside the autonomous robot 10.

The robot 10, in particular the position determination device 26, furthermore has a first sensor device 34a for determining positional data and orientation data. The first sensor device 34a in this exemplary embodiment is intended to communicate directly with the drive unit 24 for moving the robot. Using the first sensor device 34a, it is possible to draw conclusions as to the route length covered by the robot 10 from the movement, in particular resulting from a measurement of rotation of the wheels 32. The first sensor device 34a likewise detects changes in angle between covered paths or route sections. Expected position data $p_p^t$ in the form of two-dimensional coordinates of the autonomous robot 10 are determined, with respect to the surface 12 on which the robot 10 is moving, from these angles and covered route lengths.

The first sensor device 34a is furthermore intended to provide the expected position data $p_p^t$ determined from the determined positional data and orientation data to the computer unit 28 of the position determination device 26.

It is pointed out that the first sensor device 34a for providing the expected position data $p_p^t$ may also be intended to provide position data using a multiplicity of sensors, for example using GPS sensors or ultrasound sensors. By way of example, the expected position data $p_p^t$ are able to be calculated, in particular fused or averaged, from the sensor data provided by this multiplicity of sensors.

In one alternative exemplary embodiment of the robot 10 that is not illustrated in more detail, the first sensor device 34a or the position determination device 26 may be intended to fuse and to provide the expected position data $p_p^t$ based on measured positional and orientation data from the first sensor device 34a and based on previously determined actual position data $p_u^t$.

The robot 10, in particular the position determination device 26, furthermore has a second sensor device 34b for determining positional data and orientation data. The second sensor device 34b in this exemplary embodiment is designed as a lidar sensor and intended to draw conclusions as to the current position of the robot 10 resulting from a measurement of the surroundings of the robot 10. In this case, measured distances to objects surrounding the robot 10 (and not illustrated in more detail here) are compared with position data of a digital map in the context of a map comparison method, and actual position data $p_u^t$ are thereby determined by way of a map comparison method from position data provided by way of the second sensor device 34b and provided to the position determination device 26. The digital map of the surroundings in this exemplary embodiment is present in the form of a map stored in the storage unit 16 of the robot 10 internally in the device. The digital map is recorded and stored in an initial training journey.

Figure 2:
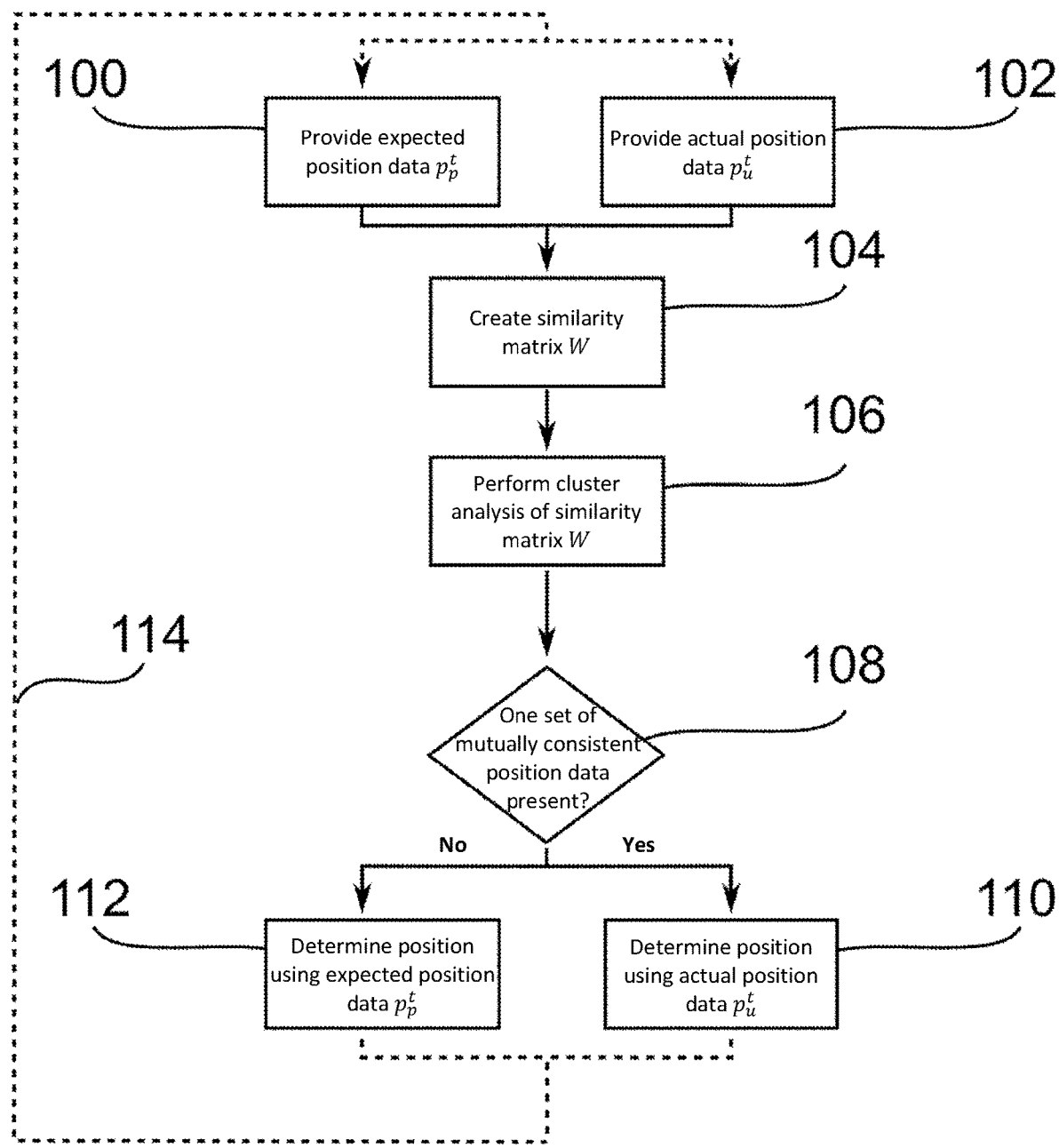
FIG. 2 shows a flowchart of one embodiment of the position determination method according to the disclosure.

FIG. 2 shows a method chart of one exemplary embodiment of the method according to the disclosure for determining the position of a robot 10, in particular of an autonomous robot 10', as described in connection with FIG. 1. In a first method step 100, expected position data $p_p^t$ regarding an expected position of the robot 10 are provided. The expected position data $p_p^t$ are recorded and provided using the first sensor device 34a, in particular in the form of inaccurate position data. In method step 102, actual position data $p_u^t$ regarding an actual position of the robot 10 are provided. The actual position data $p_u^t$ are recorded and provided using the second sensor device 34b, in particular in the form of comparatively accurate position data. In a method step 104, a similarity matrix W is created in the form of a (5×5) matrix based on in each case 5 expected position data $p_p^t$ and 5 actual position data $p_u^t$ that are provided at 5 equidistant times [$t_0, t_1, t_2, t_3, t_4$]. The number "5" and the associated equidistant times [$t_0, t_1, t_2, t_3, t_4$] are selected such that, in the case of a predefined average movement speed, in each case 1 set of in each case 5 expected position data $p_p^t$ and 5 actual position data $p_u^t$ is provided to the position determination device 30 every 10 cm (that is to say in this case: $t_0$=2 s, $t_1$=4 s, $t_2$=6 s, $t_3$=8 s, $t_4$=10 s). It is thus possible to achieve a resolution accuracy of the position of the robot 10 of ±10 cm. In method step 106, cluster analysis of the similarity matrix W is then performed, and in the process sets of in each case mutually consistent expected position data $p_p^t$ and actual position data $p_u^t$ are derived or determined. In method step 108, it is checked whether precisely one set of mutually consistent expected position data $p_p^t$ and actual position data $p_u^t$ is present in the similarity matrix W. If this check is confirmed, then the actual position data $p_u^t$ are used as position data that are free from outliers to determine the position of the robot 10 in method step 110. If this check is however not confirmed, then the expected position data $p_p^t$ are used to determine the position of the robot 10 in method step 112.

In one alternative embodiment of the method, it may also be checked in method step 108 whether the last provided actual position data $p_u^t$ are determined in the sets of in each case mutually consistent expected position data $p_p^t$ and actual position data $p_u^t$. If this check is confirmed, then the actual position data $p_u^t$ are used as position data that are free from outliers to determine the position of the robot 10 in an alternative method step 110. If this check is however not confirmed, then the expected position data $p_p^t$ are used to determine the position of the robot 10 in an alternative method step 112.

The method according to the disclosure is run through repeatedly as indicated by an arrow 114 in FIG. 2.

The invention claimed is:

1. A method for determining a position of a robot, the method comprising:
   providing expected position data including expected positions of the robot over time, using a first sensor device;
   providing actual position data including actual positions of the robot over time, using a second sensor device;
   determining, with a computer, mutually consistent expected position data and actual position data by (i) creating a similarity matrix between the expected position data and the actual position data and (ii) analyzing the similarity matrix by way of cluster analysis;
   detecting, with the computer, outliers in the expected position data and the actual position data based on the similarity matrix;
   determining, with the computer, position data that are free from outliers depending on the mutually consistent expected position data and actual position data, the detected outliers being omitted from the position data that are free from outliers, the actual position data being determined as the position data that are free from outliers in response to at least one of (i) the mutually consistent expected position data and actual position data including precisely one set of mutually consistent expected position data and actual position data and (ii) the mutually consistent expected position data and actual position data including a most recent in time actual position of the robot;
   determining, with the computer, the position of the robot based on the position data that are free from outliers; and
   autonomously navigating, with a controller, the robot to perform a task using the determined position of the robot.

2. The method as claimed in claim 1 further comprising:
   creating the similarity matrix in the form of an (n×n) matrix based on in each case n expected position data and n actual position data that are provided in each case at n times, where n is an integer number.

3. The method as claimed in claim 2 further comprising:
   specifying a resolution accuracy of the determination of the position of the robot, which defines the integer number n and a period between each of the n times.

4. The method as claimed in claim 2, wherein n is greater than or equal to 3.

5. The method as claimed in claim 2, wherein in each case the n expected position data and the n actual position data are provided in each case at n equidistant times.

6. The method as claimed in claim 2, wherein n is greater than or equal to 5.

7. The method as claimed in claim 2, wherein n greater than or equal to 7.

8. The method as claimed in claim 1, wherein the first sensor device is part of the robot.

9. The method as claimed in claim 1, the providing the expected position data further comprising:
   providing the expected position data based on previously determined actual position data.

10. The method as claimed in claim 1, wherein the second sensor device is part of the robot and the actual position data is absolute position data.

11. The method as claimed in claim 1, the providing the actual position data further comprising:
    determining the actual position data using a map comparison process from position data provided by at least one of (i) the first sensor device and (ii) the second sensor device.

12. A method as claimed in claim 1, wherein the robot is an autonomous robot.

13. A position determination device of a robot, the position determination device comprising:
    at least one computer configured to:
       receive expected position data including regarding an expected positions of the robot over time, from a first sensor device of the robot;
       receive actual position data including regarding an actual positions of the robot over time, from a second sensor device of the robot;
       determine mutually consistent expected position data and actual position data by (i) creating a similarity matrix between the expected position data and the actual position data and (ii) analyzing the similarity matrix by way of cluster analysis;
       detect outliers in the expected position data and the actual position data based on the similarity matrix;
       determine position data that are free from outliers depending on the mutually consistent expected position data and actual position data, the detected outliers being omitted from the position data that are free from outliers, the actual position data being determined as the position data that are free from outliers in response to at least one of (i) the mutually consistent expected position data and actual position data including precisely one set of mutually consistent expected position data and actual position data and (ii) the mutually consistent expected position data and actual position data including a most recent in time actual position of the robot; and
       determine the position of the robot based on the position data that are free from outliers,
    wherein a controller of the robot is configured to autonomously navigate the robot to perform a task using the determined position of the robot.

14. An autonomous robot comprising:
    a first sensor device configured to determine at least one of first positional data, first odometry data, and first orientation data, and configured to derive expected position data including regarding an expected positions of the robot over time from the at least one of the first positional data, the first odometry data, and the first orientation data;
a second sensor device configured to determine at least one of second positional data, second odometry data, and second orientation data, and configured to derive actual position data including regarding an actual positions of the robot over time from the at least one of the second positional data, the second odometry data, and the second orientation data; and
a position determination device comprising at least one computer configured to:
  receive the expected position data from the first sensor device,
  receive the actual position data from the second sensor device,
  determine mutually consistent expected position data and actual position data by (i) creating a similarity matrix between the expected position data and the actual position data and (ii) analyzing the similarity matrix by way of cluster analysis,
  detect outliers in the expected position data and the actual position data based on the similarity matrix,
  determine position data that are free from outliers depending on the mutually consistent expected position data and actual position data, the detected outliers being omitted from the position data that are free from outliers, the actual position data being determined as the position data that are free from outliers in response to at least one of (i) the mutually consistent expected position data and actual position data including precisely one set of mutually consistent expected position data and actual position data and (ii) the mutually consistent expected position data and actual position data including a most recent in time actual position of the robot, and
  determine the position of the robot based on the position data that are free from outliers; and
a controller configured autonomously navigate the robot to perform a task using the determined position of the robot.

\* \* \* \* \*